United States Patent
Reddy et al.

(10) Patent No.: US 10,336,933 B2
(45) Date of Patent: Jul. 2, 2019

(54) VULCANIZED OIL AND WATER SWELLABLE PARTICULATE COMPOSITE COMPOSITIONS

(71) Applicant: Halliburton Energy Services, Inc., Houston, TX (US)

(72) Inventors: B. Raghava Reddy, The Woodlands, TX (US); Feng Liang, Cypress, TX (US); Ronnie G. Morgan, Waurika, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 76 days.

(21) Appl. No.: 15/788,562

(22) Filed: Oct. 19, 2017

(65) Prior Publication Data
US 2018/0100095 A1   Apr. 12, 2018

Related U.S. Application Data

(62) Division of application No. 14/907,500, filed as application No. PCT/US2013/067398 on Oct. 30, 2013, now Pat. No. 9,822,295.

(51) Int. Cl.
*C09K 8/467* (2006.01)
*C04B 28/02* (2006.01)
(Continued)

(52) U.S. Cl.
CPC ............. *C09K 8/467* (2013.01); *C04B 24/24* (2013.01); *C04B 24/2641* (2013.01);
(Continued)

(58) Field of Classification Search
CPC ......... C04B 28/02; C04B 14/30; C04B 24/08; C04B 24/2641; C04B 24/2652;
(Continued)

(56) References Cited

U.S. PATENT DOCUMENTS 4,590,227 A   5/1986   Nakamura et al.
4,982,793 A   1/1991   Holtmyer et al.
(Continued)

FOREIGN PATENT DOCUMENTS

WO   WO-1989011505 A1   11/1989
WO   WO-200039237 A1    7/2000
WO   WO-2006061561 A1   6/2006

OTHER PUBLICATIONS

Berry et al., "Case Histories of Wellbore Cleanouts Using Near-Neutral Derusting Solution," SPE 89716, Annual Technical Conference and Exhibition, Sep. 2004.
(Continued)

*Primary Examiner* — Frances Tischler
(74) *Attorney, Agent, or Firm* — Thomas Rooney; C. Tumey Law Group PLLC

(57) ABSTRACT

Embodiments herein include a method comprising providing a self-sealing cement slurry comprising an aqueous base fluid, a cementitious material, and a vulcanized oil and water swellable particulate composite, wherein the vulcanized oil and water swellable particulate composite comprises an elastomer, a crosslinked water swellable superabsorbent polymer, and a hydrophobically modified water-soluble polymer; introducing the self-sealing cement slurry into a subterranean formation; and allowing the self-sealing cement slurry to set, wherein the vulcanized oil and water swellable particulate composite is capable of swelling in the presence of a non-aqueous fluid and an aqueous fluid to reduce the permeability of fluid flowpaths in the set self-sealing cement slurry upon loss of structural integrity.

18 Claims, 3 Drawing Sheets

(51) Int. Cl.
*C04B 24/24* (2006.01)
*C04B 24/26* (2006.01)
*C04B 24/38* (2006.01)
*E21B 33/14* (2006.01)
*C04B 103/00* (2006.01)

(52) U.S. Cl.
CPC ........ *C04B 24/2652* (2013.01); *C04B 24/383* (2013.01); *C04B 28/02* (2013.01); *E21B 33/14* (2013.01); *C04B 2103/0049* (2013.01); *C04B 2103/0053* (2013.01); *C04B 2103/0062* (2013.01)

(58) Field of Classification Search
CPC . C04B 24/383; C04B 2103/52; C04B 24/161; C04B 24/2623; C04B 2103/0049; C04B 2103/0053; C04B 2103/0062; C04B 24/24; E21B 33/14
See application file for complete search history.

(56) References Cited

U.S. PATENT DOCUMENTS

| | | | |
|---|---|---|---|
| 5,067,565 A | 11/1991 | Holtmyer et al. |
| 5,122,549 A | 6/1992 | Holtmyer et al. |
| 5,779,787 A | 7/1998 | Brothers et al. |
| 6,207,771 B1 | 3/2001 | Larson |
| 6,364,016 B1 | 4/2002 | Dalrymple et al. |
| 6,476,169 B1 | 11/2002 | Eoff et al. |
| 6,516,885 B1 | 2/2003 | Munday |
| 6,962,201 B2 | 11/2005 | Brothers |
| 7,114,568 B2 | 10/2006 | Eoff et al. |
| 7,159,656 B2 | 1/2007 | Eoff et al. |
| 7,530,396 B1 | 5/2009 | Reddy et al. |
| 7,589,048 B2 | 9/2009 | Eoff et al. |
| 7,595,283 B2 | 9/2009 | Eoff et al. |
| 7,647,970 B2 | 1/2010 | Mueller et al. |
| 7,687,571 B2 | 3/2010 | Vaidya et al. |
| 7,759,292 B2 | 7/2010 | Eoff et al. |
| 7,934,554 B2 | 5/2011 | Roddy |
| 8,008,235 B2 | 8/2011 | Eoff et al. |
| 8,240,377 B2 | 8/2012 | Kulakofsky et al. |
| 8,273,692 B2 | 9/2012 | Eoff et al. |
| 2004/0024154 A1 | 2/2004 | Schinabeck et al. |
| 2005/0178549 A1 | 8/2005 | Eoff et al. |
| 2005/0230114 A1 | 10/2005 | Eoff et al. |
| 2007/0044962 A1 | 3/2007 | Tibbles |
| 2008/0099203 A1 | 5/2008 | Mueller et al. |
| 2008/0135250 A1 | 6/2008 | Bosma et al. |
| 2009/0139710 A1 | 6/2009 | Robisson et al. |
| 2011/0034351 A1 | 2/2011 | Eoff et al. |
| 2011/0107848 A1 | 5/2011 | Le Roy-Delage et al. |
| 2011/0253393 A1 | 10/2011 | Vaidya et al. |
| 2012/0168166 A1 | 7/2012 | Dalrymple et al. |
| 2012/0264885 A1 | 10/2012 | Eoff et al. |
| 2014/0060843 A1 | 3/2014 | Murphy et al. |

OTHER PUBLICATIONS

Roy-Delage et al., "Self-Healing Cement System—A Step Forward in Reducing Long-Term Environmental Impact," IADC/SPE 128226, 2010.

International Search Report and Written Opinion from PCT/US2013/067398, dated Jul. 28, 2014.

VULCANIZED OIL AND WATER SWELLABLE PARTICULATE COMPOSITE COMPOSITIONS

CROSS-REFERENCE TO RELATED APPLICATIONS

This application is a divisional of U.S. patent application Ser. No. 14/907,500, filed on Jan. 25, 2016, which is the U.S. National Stage of International Application No. PCT/US2013/067398, filed Oct. 30, 2013, the disclosures of which are incorporated herein by reference in their entireties.

BACKGROUND

The embodiments described herein relate to vulcanized oil and water swellable particulate composite compositions, which may be used to form self-sealing cement slurries.

Subterranean formation operations (e.g., stimulation operations, sand control operations, completion operations, etc.) often involve placing a cement column around a casing (or liner) string in a wellbore. The cement column is formed by pumping a cement slurry through the bottom of the casing and out through an annulus between the outer casing wall and the formation face of the wellbore, known as primary cementing. The cement slurry cures in the annular space, thereby forming a column of hardened cement (or "sheath") that, inter alia, supports and positions the casing in the wellbore and bonds the exterior surface of the casing to the subterranean formation. Among other things, the cement column may keep fresh water zones from becoming contaminated with produced fluids from within the wellbore. As used herein, the term "fluid" refers to liquid phase fluids and gas phase fluids. The cement column may also prevent unstable formations from caving in, thereby reducing the chance of a stuck drill pipe or a casing collapse. Additionally, the cement column may form a solid barrier to prevent fluid loss or contamination of production zones. Subsequent secondary cementing operations may also be performed.

The degree of success of a wellbore operation involving placement of a cement column therefore depends, at least in part, upon the successful cementing of the wellbore casing. During the completion and/or productive phase of a wellbore, for example, a cement sheath may be subjected to certain stresses including, among other things, pressure and temperature changes in the wellbore. Additionally, the cement sheath may shrink and create microannuli between the casing and cement and/or the formation and the cement sheath. As a result, the cement sheath may develop cracks internally or debond from the casing or subterranean formation itself, resulting in the formation of channels within the cement sheath or at its interfaces within the formation or the casing, thereby creating flow pathways for unwanted fluid invasion and migration. As used herein, the term "microannulus" and all of its variations refers to an inherent quality of cement, where the cement does not fully occupy the annulus between the casing and the formation face due to cement shrinkage. As used herein, the term "channel" refers to a defect in the matrix of the set cement, wherein the matrix of the set cement contains one or more cracks which may have sufficient inter-crack connectivity to provide continuous flow paths to enable undesirable fluid flow from the formation or other parts of the wellbore to the wellhead and/or wellbore. Such channels may result in hazardous situations (e.g., natural gas contamination or accumulation due to loss of zonal isolation).

The formation of channels in a cement sheath may result in loss of integrity of the cement sheath and failure of zonal isolation or wellbore structural failure. Because of the damaging effects of fluid invasion into a cement column, it is desirable to repair cracked or shrunken sheaths as they occur. Traditional techniques may involve, for example, squeeze cementing. As used herein, the term "squeeze cementing" refers to the process of forcing a cement slurry though channels, holes, or splits in a casing or liner so as to fill the voids and form an impenetrable barrier. Squeeze cementing can be particularly costly and may also result in a substantial reduction in production efficiency due to required downtime. Another technique may involve placing a water swellable compound (e.g., a polymer) into a cement slurry prior to pumping the cement slurry into a subterranean formation and forming a cement sheath. Traditional water swellable compounds when included in cement slurries may absorb water from the slurry during placement and increase the viscosity of a cement slurry so as to render it unpumpable and/or unsuitable for forming a stable cement sheath. Additionally, such water swellable compounds do not swell in the presence of non-aqueous fluids.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

Figure 1:
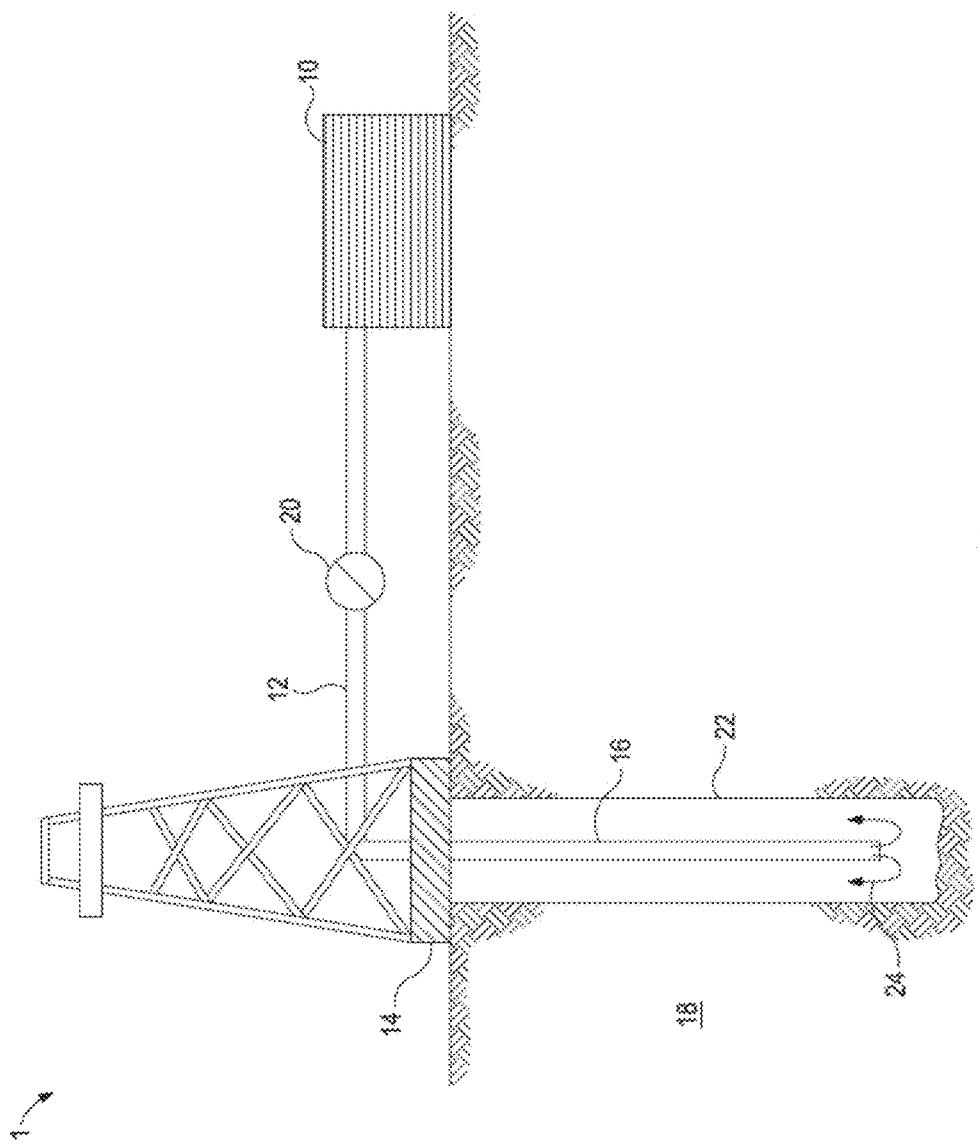
FIG. 1 illustrates a system for delivering the self-sealing cement compositions comprising the vulcanized oil and water swellable particulate composites to a downhole location.

The embodiments described herein relate to vulcanized oil and water swellable particulate composite compositions, which may be used to form self-sealing cement slurries. Specifically, the vulcanized oil and water swellable particulate composite compositions described herein may form a portion of a cement sheath and may swell in the event of invasion of non-aqueous and/or aqueous fluids from the formation or other parts of the wellbore, thereby self-sealing any formed channels and flowpaths therein.

Although some embodiments described herein are illustrated by reference to cementing operations, the vulcanized oil and water swellable particulate composites disclosed herein may be used in any subterranean formation operation that may benefit from their swellability in the presence of either or both of oil and water, for example, as temporary or permanent barriers to fluid flow during or after a wellbore treatment operation. Such treatment operations may include, but are not limited to, a drilling operation; a stimulation operation; an acidizing operation; an acid-fracturing operation; a sand control operation; a completion operation; a scale inhibiting operation; a water-blocking operation; a clay stabilizer operation; a fracturing operation; a frac-packing operation; a gravel packing operation; a wellbore strengthening operation; a sag control operation; and any combination thereof.

Moreover, the vulcanized oil and water swellable particulate composites described herein may be used in any non-subterranean operation that may benefit from their swellable properties. Such operations may be performed in any industry including, but not limited to, oil and gas, drilling and completing water wells for drinking supply or irrigation, mining, chemical, pulp and paper, aerospace, medical, automotive, and the like.

One or more illustrative embodiments disclosed herein are presented below. Not all features of an actual implementation are described or shown in this application for the sake of clarity. It is understood that in the development of an actual embodiment incorporating the embodiments disclosed herein, numerous implementation-specific decisions must be made to achieve the developer's goals, such as compliance with system-related, lithology-related, business-related, government-related, and other constraints, which vary by implementation and from time to time. While a developer's efforts might be complex and time-consuming, such efforts would be, nevertheless, a routine undertaking for those of ordinary skill in the art having benefit of this disclosure.

It should be noted that when "about" is provided herein at the beginning of a numerical list, the term modifies each number of the numerical list. In some numerical listings of ranges, some lower limits listed may be greater than some upper limits listed. One skilled in the art will recognize that the selected subset will require the selection of an upper limit in excess of the selected lower limit. Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the exemplary embodiments described herein. At the very least, and not as an attempt to limit the application of the doctrine of equivalents to the scope of the claim, each numerical parameter should at least be construed in light of the number of reported significant digits and by applying ordinary rounding techniques.

While compositions and methods are described herein in terms of "comprising" various components or steps, the compositions and methods can also "consist essentially of" or "consist of" the various components and steps. When "comprising" is used in a claim, it is open-ended.

In some embodiments, a method is disclosed comprising providing a self-sealing cement slurry comprising an aqueous base fluid, a cementitious material, and a vulcanized oil and water swellable particulate composite. The vulcanized oil and water swellable particulate composite comprises a vulcanized elastomer, a crosslinked water swellable superabsorbent polymer, and a hydrophobically modified water-soluble polymer. The self-sealing cement slurry is introduced into a subterranean formation, such as in an annulus formed between a casing string and the subterranean formation face and allowed to set. If the set self-sealing cement slurry loses its mechanical sealing integrity due to the formation of fluid flowpaths therein or debonding at the interfaces, the vulcanized oil and water swellable particulate composite is capable of swelling in the presence of either or both of non-aqueous and aqueous fluids in the fluid exposed flowpaths. The fluid flowpaths may develop within the set self-sealing cement slurry or at the interface between the set self-sealing cement slurry and surrounding surfaces (e.g., the casing string and/or the subterranean formation face). Such fluid flowpaths may form at any time after the self-sealing cement slurry is set, such as during the stimulation, completion, and/or production phase of the subterranean formation or any other phase during the lifecycle of the wellbore.

In other embodiments, a vulcanized oil and water swellable particulate composite is provided that is capable of swelling in the presence of either or both of a non-aqueous fluid and an aqueous fluid. The vulcanized oil and water swellable particulate composite comprises an elastomer, a crosslinked water swellable superabsorbent polymer, and a hydrophobically modified water-soluble polymer. The elastomer comprises a non-polar monomer, a polar monomer, and an ionizable polar monomer.

The vulcanized oil and water swellable particulate composites disclosed in some embodiments herein may swell in the presence of non-aqueous fluids and/or aqueous fluids. Such non-aqueous fluids may include, but are not limited to, an alkane; an olefin; an aromatic organic compound; a cyclic alkane; a paraffin; a diesel fluid; a mineral oil; a desulfurized hydrogenated kerosene; and any combination thereof. Examples of aqueous fluids that may contact the vulcanized oil and water swellable particulate composite and cause it to swell may include, but are not limited to, fresh water; saltwater (e.g., water containing one or more salts dissolved therein); brine (e.g., saturated salt water); seawater; produced water; flowback water; and any combination thereof. Generally, the aqueous fluid may be from any source, provided that it does not adversely interfere with the vulcanized oil and water swellable particulate composites described herein. The non-aqueous and/or aqueous fluids that the vulcanized oil and water swellable particulate composite may encounter in a wellbore (e.g., in a cement sheath disposed in a wellbore) may be from any source including, for example, the subterranean formation itself (e.g., water zones or hydrocarbon producing zones) or fluids that are placed downhole for the purpose of performing subterranean formation operations.

The elastomer forming a portion of the vulcanized oil and water swellable particulate composites comprises a non-polar monomer, a polar monomer, and an ionizable polar monomer. The individual monomers making up the elastomers described herein may interact so as to impart elasticity, polarit, and bonding ability to inorganic and metal surfaces to the elastomer. The polar monomers may additionally aid in increasing the hydropilicity of the elastomer, and in some cases, increase the bonding strength between the elastomer and cementitious material, surfaces of a subterranean formation, and/or surfaces of a casing string.

Suitable non-polar monomers for use in the elastomers disclosed herein may include, but are not limited to, a diene (e.g., a butadiene, a hexadiene, a cyclopentadiene, and the like); a substituted diene (e.g., isoprene); an alpha-olefin (e.g., ethylene, propene, 1-butene, 1-pentene, vinyl cyclohexene, styrene, and the like); and any combination thereof. In some embodiments, the non-polar monomer may be present in the elastomer described herein in an amount in the range of from a lower limit of about 0.1%, 1%, 5%, 10%, 15%, 20%, and 25% to an upper limit of about 50%, 45%, 40%, 35%, 30%, and 25% by total weight of the elastomer.

In some embodiments, the polar monomers for use in the elastomers described herein may be non-ionic. Suitable examples of polar monomers for use in the elastomers described herein may include, but are not limited to, an acrylonitrile; a N-alkoxyalkyl acrylamide; a vinyl acetate; a vinylformamide; a vinyl acetamide; a vinyl methyl ether; a vinyl pyrrolidone; an acrylate; a vinyl siloxane; and any combination thereof. In some embodiments, the polar monomer is capable of generating a carboxylate group, which may enhance the hydrophilicity of the elastomer and aid in bonding with the cementitious material. For example, these polar monomers may permit chemical interaction between them and the cementitious material and/or the metallic or mineral components in the casing or formation, allowing better incorporation of the vulcanized oil and water swellable particulate composites within, for example, a self-sealing cement slurry and improve adhesion or bonding within the cement and the cement interfaces. In some embodiments, the polar monomer may be present in the elastomer described herein in an amount in the range of from a lower limit of about 10%, 12%, 14%, 16%, 18%, 20%, 22%, 24%, 26%, 28%, and 30% to an upper limit of about 50%, 48%, 46%, 44%, 42%, 40%, 38%, 36%, 34%, 32%, and 30% by total weight of the elastomer.

Suitable examples of ionizable polar monomers that may be used in the elastomers described herein may include, but are not limited to, a carboxylic acid; a carboxylic acid derivative; a salt of carboxylic acid; a sulfonic acid; a salt of sulfonic acid; and any combination thereof. The carboxylic acid derivative may be capable of generating carboxylic acid or its salt by interaction with the cement matrix. In general, the carboxylate group or its derivative of the ionizable polar monomer in the elastomers described herein has the general formula —COOR, wherein R may be a hydrogen; a metal (e.g., an alkali metal, an alkaline earth metal, or a transition metal); an ammonium group; a quaternary ammonium group, an acyl group (e.g., acetyl ($CH_3C(O)$) group); an alkyl group (e.g., an ester); an acid anhydride group; and any combination thereof. Examples of suitable carboxylate groups may include, but are not limited to carboxylic acid; carboxy esters; carboxy acid anhydrides; monovalent, divalent, and trivalent metal salts of carboxy acids; and any combination thereof. In some embodiments, the ionizable polar monomers may be present in the elastomer described herein in an amount in the range of from a lower limit of about 0.1%, 0.25%, 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, and 5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, 5.5%, 5.25%, and 5% by total weight of the elastomer.

In some embodiments, the elastomer may be present in the vulcanized oil and water swellable particulate composite in an amount in the range of from a lower limit of about 30%, 32%, 34%, 36%, 38%, 40%, 42%, 44%, 46%, 48%, 50%, 52%, 54%, and 56% to an upper limit of about 80%, 78%, 76%, 74%, 72%, 70%, 68%, 66%, 64%, 62%, 60%, 58%, and 56% by weight of the combined elastomer, crosslinked water swellable superabsorbent polymer, and hydrophobically modified water-soluble polymer in the vulcanized oil and water swellable particulate composite. Suitable commercially available elastomers for use in the vulcanized oil and water swellable particulate composites described herein may include, but are not limited to KRYNAC® X 146 and KRYNAC® X 750, carboxylated butadiene-acrylonitrile terpolymers, available from LANXESS Deutschland GmbH.

The crosslinked water swellable superabsorbent polymer for use in forming the vulcanized oil and water swellable particulate composites described in some embodiments herein may be capable of absorbing large amounts of aqueous fluid and retaining such fluid even under relatively high pressures. Suitable crosslinked water swellable superabsorbent polymers may include, but are not limited to, a crosslinked polyacrylate-based polymer (e.g., sodium polyacrylate); a crosslinked polyacrylamide-based polymer; a crosslinked polyvinyl alcohol polymer; a crosslinked starch-polyacrylonitrile graft polymer; any copolymer thereof; any terpolymer thereof; and any combination thereof. In some embodiments, the crosslinked water swellable superabsorbent polymer may be present in the vulcanized oil and water swellable particulate composite in an amount in the range of from a lower limit of about 30%, 31%, 32%, 33%, 34%, 35%, 36%, 37%, 38%, 39%, and 40% to an upper limit of about 50%, 49%, 48%, 47%, 46%, 45%, 44%, 43%, 42%, 41%, and 40% by weight of the combined elastomer, crosslinked water swellable superabsorbent polymer, and hydrophobically modified water-soluble polymer in the vulcanized oil and water swellable particulate composite. Suitable examples of commercially available crosslinked water swellable superabsorbent polymers may include, but are not limited to, HYSORB™ 8100, a crosslinked polyacrylate homopolymer (sodium salt), available from BASF in Charlotte, N.C. and DIAMOND SEAL™, a crosslinked polyacrylamide polymer, available from Halliburton Energy Services, Inc. in Houston, Tex.

The hydrophobically modified water-soluble polymers for use in the vulcanized oil and water swellable particulate composites described herein may additionally enhance the performance of the vulcanized oil and water swellable particulate composites in aqueous media, such as in the self-sealing cement slurries described herein or any other aqueous media that might benefit from the swellable properties of the vulcanized oil and water swellable composites. Generally, the hydrophobically modified water-soluble polymers are not crosslinked. However, in some embodiments, crosslinking may be permitted. As used herein, the term "hydrophobically modified" refers to a monomer or polymer having hydrophobic compound(s) chemically attached thereto. The hydrophobically modified water-soluble polymer may be cationic; anionic; nonionic; and any combination thereof. In some embodiments, the hydrophobically modified water-soluble polymers may have molecular weights in the range of from a lower limit of about 500,000, 975,000, 1,450,000, 1,925,000, 2,400,000, 2,875,000, 3,350,000, 3,825,000, 4,300,000, and 4,775,000 to an upper limit of about 10,000,000, 9,525,000, 9,050,000, 8,575,000, 8,100,000, 7,625,000, 7,150,000, 6,675,000, 6,200,000, 5,725,000, 5,250,000, and 4,775,000, and any value therebetween. In some embodiments, the hydrophobically modified water-soluble polymers may have molecular weights in the range of from about 1,000,000 to about 8,000,000. The hydrophobically modified water-soluble polymers may be synthesized by any method known to those having ordinary skill in the art, such as by a polymerization reaction. In some embodiments, the hydrophobically modified water-soluble polymer is used in the vulcanized oil and water swellable particulate composites in particulate form during the production of the vulcanized oil and water swellable particulate composites.

In some embodiments, the hydrophobically modified water-soluble polymer may be synthesized by hydrophobic modification of a hydrophilic polymer. Suitable hydrophilic polymers may include, but are not limited to, a polyacrylamide; a poly(methacrylamide); a polyvinylamine; a poly (vinyl alcohol); a polyvinyl acetate; a polyacrylate; a polyethylene oxide; a polyethylene oxide methyl ether; a polyethylene glycol; a cellulose; a chitostan; a polyamide; a polyetheramine; a polyethyleneimine; a polyhydroxyetheramine; a polylysine; a polysulfone; a starch; a gum; a protein; a poly(itaconic acid); a poly((E)-but-2-enoic acid); a poly(acrylic acid); a poly(malonic acid); a poly(methacrylic acid); a poly(maleic acid); a poly(maleic anhydride); a poly(citraconic anhydride); a poly(2-acrylamidomethylpropanesulfonic acid); a poly(1-allyloxy-2-hydroxypropyl sulfonic acid); a poly(vinyl pyrrolidone); a poly(N-vinyl formamide); a poly(diallyldimethylammonium sulfate); a poly(methacryloylethyltrimethylamine); a poly(dimethylaminopropyl methacrylamide); a poly(2-methacryloxyethyltrimethylammonium chloride); poly(hydroxyethyl acrylate); a poly(vinylsulfonic acid); a poly(vinylphosphonic acid); a poly(N-vinyl caprolactam); a poly(N-vinylformamide); a polymer of N,N-diallylacetamide; a poly(dimethyldiallyl-ammonium halide); a poly(styrene sulfonic acid); a polymer of methacrylamidoethyltrimethyl ammonium halide; a poly(N,N-dimethylacrylamide); a poly(dimethylaminoethyl methacrylate); any derivative thereof; any copolymer thereof; any terpolymer thereof; and any combination thereof.

Specific hydrophilic polymers for use in the hydrophobically modified water-soluble polymers may include, but are not limited to, a poly(dimethyaminoethylmethacrylate); a poly(acrylamide/dimethylaminoethyl methacrylate); a poly(methacrylic acid/dimethylaminoethyl methacrylate); a poly(2-acrylamido-2-methyl propane sulfonic acid/dimentylaminoethyl methacrylate); a poly(acrylamide/dimethylaminopropyl methacrylamide); a poly(acrylic acid/dimethylaminopropyl methacrylamide); a polymer of acrylic acid and a C10-C30 alkyl acrylate; a hydroxyethyl cellulose; any copolymer thereof; any terpolymer thereof; and any combination thereof.

In some embodiments, the hydrophobically modified water-soluble polymers may be synthesized by a reaction of hydrophilic monomer(s) capable of forming any of the hydrophilic polymers, followed by hydrophobic modification of the hydrophilic polymer. In other embodiments, the hydrophilically modified water-soluble polymers may be formed by a reaction comprising a hydrophilic monomer(s) and a hydrophobically modified hydrophilic monomer(s). The hydrophilic monomer(s) for use in any capacity, including as hydrophilic monomer(s) or as hydrophobically modified hydrophilic monomer(s), may be any monomer capable of forming any hydrophilic polymer that is capable of hydrophobic modification either in its monomer form (as is the case with the hydrophobically modified hydrophilic monomer) or after reacting to form a hydrophilic polymer to become a hydrophobically modified water-soluble polymer. Suitable hydrophilic monomers, for example, for use in any capacity disclosed herein may be any monomer capable of forming the hydrophilic polymers described herein. Examples of suitable hydrophilic monomers include, but are not limited to, acrylamide; methacrylamide; cellulose; vinylamine; vinyl alcohol; vinyl acetate; alkyl acrylate; an acrylate salt of alkali earth metal; an acrylate salt of alkaline earth methal; ethylene oxide; ethylene glycol; glucose; glucosamine; ethyleneimine; lysine; a sulfone; acrylic acid; methacrylic acid; an alkali earth metal salt of methacrylic acid; an alkaline earth metal salt of methacrylic acid; 2-acrylamido-2-methyl propane sulfonic acid; an alkali earth metal salt of 2-acrylamido-2-methyl propane sulfonic acid; an alkaline earth metal salt of 2-acrylamido-2-methyl propane sulfonic acid; N,N-dimethyl acrylamide; vinyl pyrrolidone; dimethylaminoethyl methacrylate; dimethylaminopropyl methacrylamide; trimethylammoniumethyl methacrylate chloride; hydroxyethyl acrylate; vinyl sulfonic acid; an alkali earth metal salt of vinyl sulfonic acid; an alkaline earth metal salt of vinyl sulfonic acid; vinyl phosphonic acid; an alkali earth metal salt of vinyl phosphonic acid; an alkaline earth metal salt of vinyl phosphonic acid; vinyl caprolactam; N-vinylformamide; N,N-diallylacetamide; dimethyl-diallyl-ammonium halide; itaconic acid; styrene sulfonic acid; methacrylamidoethyltrimethyl ammonium halide; (E)-but-2-enoic acid; malonic acid; maleic acid; maleic anhydride; citraconic anhydride; 1-allyloxy-2-hydroxypropyl sulfonic acid; N-vinyl formamide; diallyl dimethylammonium sulfate; methacrylamidopropyltrimethylammonium chloride; octadecyldimethylammoniumethyl methacrylate bromide; hexadecyldimethylammoniumethyl methacrylate bromide; hexadecyldimethylammoniumpropyl methacrylamide bromide; 2-ethylhexyl methacrylate; hexadecylmethacrylamide; quaternary salt derivatives of acrylamide; quaternary salt derivatives of acrylic acid; and any combination thereof.

In some embodiments, the hydrophilic monomers, hydrophilic polymers, and/or the hydrophobically modified hydrophilic monomers may additionally be hydrophilically modified so as to, for example, introduce or enhance branching, so long as the function of the hydrophobically modified water-soluble polymer is not adversely affected. The hydrophilic modification may occur before or after hydrophobic modification to a hydrophilic monomer or a hydrophilic polymer and may be achieved using one or more hydrophilic groups. Any compound containing hydrophilic groups capable of introducing into or enhancing the hydrophobicity of the polymer or its braches may be used for hydrophilic modification. Suitable hydrophilic groups may include, but are not limited to, a hydroxyl group; a carbonyl group; a carboxyl group; a sulfhydryl group; an amino group; a phosphate group; a polyether group; any derivative thereof; and any combination thereof. Preferably, if a polyether group is used for hydrophilic modification, it also comprises a halogen; sulfonate; sulfate; organic acid; epichlorohydrin-terminated polyethylene oxide methyl ether; or a derivative thereof. Suitable polyether groups include, but are not limited to, polyethylene oxide; polypropylene oxide; polybutylene oxide; copolymers thereof; terpolymers thereof; and any combination thereof. Typically, the hydrophilic modification of the hydrophilic monomers, hydrophilic polymers, and/or the hydrophobically modified hydrophilic monomers has a weight ratio in the range of from a lower limit of about 1:1, 1.5:1, 2:1, 2.5:1, 3:1, 3.5:1, 4:1, 4.5:1, and 5:1 to an upper limit of about 10:1, 9.5:1, 9:1, 8.5:1, 8:1, 7.5:1, 7:1, 6.5:1, 6:1, 5.5:1, and 5:1, and any value therebetween.

In some embodiments, the backbone or pendent groups of the hydrophobically modified water-soluble polymer (e.g., the hydrophilic polymer backbone formed before or after hydrophobic modification with hydrophobic compound(s)) may comprise reactive amino groups capable of reacting with hydrophobic groups. Suitable amino groups may include, but are not limited to, a dimethyl-amino group, such as those in dimethylaminoethyl methacrylate, a dimethylaminopropyl methacrylamide, and any combination thereof. In other embodiments, the hydrophobically modified water-soluble polymer backbone may comprise polar heteroatoms including, but not limited to, oxygen; nitrogen; sulfur; phosphorous; and any combination thereof in the polymer backbone or pendent groups. Suitable examples may include hydrophobically modified celluloses, starches, gums, and the like. Suitable commercially available hydrophobically modified water-soluble polymers may include, but are not limited to METHOCEL™ and ETHOCEL™ available from The Dow Chemical Company in Midland, Mich.; ESAFLOR, a hydrophobically modified guar available from Lamberti SpA in Gallarate, Varese, Italy; and NATROSOL® PLUS available from Ashland Inc. in Covington, Ky.

The hydrophobic compounds capable of reacting with the hydrophilic polymer or a hydrophilic monomer to form the hydrophobically modified water-soluble polymers of the embodiments described herein may include an alkyl halide; a sulfonate; a sulfate; an organic acid; any derivative thereof; and any combination thereof. Suitable hydrophobic compounds include, but are not limited to, octenyl succinic acid; an anhydride of octenyl succinic acid; an ester of octenyl succinic acid; an imide of octenyl succinic acid; an amide of octenyl succinic acid; dodecenyl succinic acid; an anhydride of dodecenyl succinic acid; an ester of dodecenyl succinic acid; an imide of dodecenyl succinic acid; an amide of dodecenyl succinic acid; vinyl ester; alkyl ester of acrylic acid; alkylaryl alcohol ester of acrylic acid; alkyl ester of methacrylic acid; alkylaryl alcohol ester of methacrylic acid; alkyl halide; 1-vinylnaphthalene; and any combination thereof. In certain embodiments, the hydrophobic compound may have an alkyl chain length of from about 6 to about 22 carbons, and any value therebetween. In another embodiment, the hydrophobic group may have an alkyl chain length of from about 7 to about 20 carbons, and any value therebetween. In still other embodiments, the hydrophobic compound may have an alkyl chain length of from about 12 to about 18 carbons, and any value therebetween. In some embodiments, when the hydrophobically modified water-soluble polymer contains polar heteroatoms, particularly oxygen atoms such as in celluloses, the carbon length of the hydrophobic groups may be from about 1 carbon to about 20 carbons.

In those embodiments in which the hydrophobically modified water-soluble polymers are formed by first providing a hydrophilic polymer or by providing a hydrophilic polymer after polymerizing hydrophilic monomers, the molar ratio of hydrophilic polymer or hydrophilic monomers to hydrophobic compound(s) is in the range of from about 99.98:0.02 to about 90:10, and any value therebetween. In those embodiments in which the hydrophobically modified water-soluble polymer is formed by a polymerization reaction of a hydrophilic monomer(s) and a hydrophobically modified hydrophilic monomer(s), the molar ratio of the hydrophilic monomer(s) to hydrophobically modified hydrophilic monomer(s) in the hydrophobically modified water-soluble polymer is in the range of from about 99.98: 0.02 to about 90:10, and any value therebetween.

In some embodiments, the hydrophobically modified water-soluble polymer may be present in the vulcanized oil and water swellable particulate composite in an amount in the range of from a lower limit of about 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5%, 5.25%, and 5.5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, and 5.5% by weight of the combined elastomer, crosslinked water swellable superabsorbent polymer, and hydrophobically modified water-soluble polymer in the vulcanized oil and water swellable particulate composite. Suitable commercially hydrophobically modified water-soluble polymers for use in forming the vulcanized oil and water swellable particulate composites described in some embodiments herein may include, but is not limited to, NATROSOL® PLUS CS, Grade 330, a hydrophobically modified hydroxyethyl cellulose, from Ashland Inc., in Covington, Ky.; PEMULEN™ TR-1, a hydrophobically modified polyacrylic acid having a relatively low level of hydrophobic groups, available from The Lubrizol Corporation in Wickliffe, Ohio; and PEMULEN™ TR-2, a hydrophobically modified polyacrylic acid having a relatively high level of hydrophobic groups, available from The Lubrizol Corporation in Wickliffe, Ohio.

The vulcanized oil and water swellable particulate composites may be synthesized by any means known to one of skill in the art, provided that such synthesis does not adversely affect the properties of the vulcanized oil and water swellable particulate composites. One such synthesis may include mixing the elastomer, the crosslinked water swellable superabsorbent polymer, and the hydrophobically modified water-soluble polymer together (e.g., in particulate form or as oil emulsions during the manufacturing phase or a separate phase). Thereafter, each component is melt blended together in a process termed "mastication" to form a single component. As used herein, the term "melt blend" refers to melting the elastomer with heat and mechanical mixing energy at or above the highest glass transition temperature of the elastomer. Thereafter, the melt blended elastomer, the crosslinked water swellable superabsorbent polymer, and the hydrophobically modified water-soluble polymer may be vulcanized to form the vulcanized oil and water swellable particulate composites disclosed herein. As used herein, the term "vulcanized" and all of its variants (e.g., "vulcanize" or "vulcanization") refers to curing the oil and water swellable composites by treating with sulfur or other radical generators at a high temperature. Vulcanization may be performed using any suitable vulcanizing agent compatible with the elastomer, the crosslinked water swellable superabsorbent polymer, and the hydrophobically modified water-soluble polymer. Suitable vulcanizing agents may include, but are not limited to, organic peroxide, sulfur, sulfur monochloride, sulfur dichloride, morpholine disulfide, alkylphenol disulfide, tetramethylthionium disulfide and selenium dimethyledithiocarbamate; and any combination thereof. In some embodiments, the vulcanizing agent may preferably be an organic peroxide including, but not limited to, alpha,alpha-Bis(t-butylperoxy)diisopropylbenzene; 2,5-dimethyl-2,5-di-(benzoylperoxy)hexane; 2,5-dimethyl-2,5-di-(tert-butylperoxy)hexyne-3; di-tert-butyl peroxide; di-tert-butylperoxy-3,3,5-trimethylcyclohexane; tertbutyl hydroperoxide; and any combination thereof. A suitable commercially available vulcanizing agent may include, but is not limited to, VUL-CUP® 40KE, an organic peroxide vulcanizing agent present in an inorganic inert support, available from Arkema, Inc. in Colombes, France.

After vulcanization, the vulcanized oil and water swellable particulate composites may be ground or otherwise sized by any means to any suitable size for use in a particular operation. The vulcanized oil and water swellable particulate composites may be of any shape and size suitable for use in a particular subterranean formation. In some embodiments, the vulcanized oil and water swellable particulate composites may be substantially spherical. In such embodiments, the vulcanized oil and water swellable particulate composites may be sized such that they have an average diameter in the range of from a lower limit of about 20 µm, 70 µm, 120 µm, 170 µm, 220 µm, 270 µm, 320 µm, 370 µm, 420 µm, 470 µm, and 520 µm to an upper limit of about 1000 µm, 950 µm, 900 µm, 850 µm, 800 µm, 750 µm, 700 µm, 650 µm, 600 µm, 550 µm, and 500 µm. In other embodiments, the vulcanized oil and water swellable particulate composites may be sized such that they have an average diameter of about 250 µm to about 750 µm. In still other embodiments, the vulcanized oil and water swellable particulate composites may be preferably sized so as to have an average diameter of about 500 μm. In other embodiments, the vulcanized oil and water swellable particulate composites may be substantially non-spherical, such as fibrous shaped; polygonal shaped; any other shape; and any combination thereof. In such embodiments, the vulcanized oil and water swellable particulate composites may be sized such that they are capable of passing through mesh, U.S. Sieve Series in the range of a lower limit of about 625 mesh, 595 mesh, 565 mesh, 535 mesh, 505 mesh, 475 mesh, 445 mesh, 415 mesh, 385 mesh, 355 mesh, and 325 mesh, to an upper limit of about 18 mesh, 48 mesh, 78 mesh, 108 mesh, 138 mesh, 168 mesh, 198 mesh, 228 mesh, 258 mesh, 288 mesh, 318 mesh, and 348 mesh.

In some embodiments, the vulcanized oil and water swellable particulate composites may be melt blended (or masticated) in the presence of fresh water to facilitate homogenization of the composites. In such embodiments, the optional fresh water may be present in the range of from a lower limit of about 5%, 5.25%, 5.5%, 5.75%, 6%, 6.25%, 6.5%, 6.75%, 7%, 7.25%, 7.5%, 7.75%, 8%, 8.25%, 8.5%, 8.75%, 9%, 9.25%, and 9.5% to an upper limit of about 15%, 14.75%, 14.5%, 14.25%, 14%, 13.75%, 13.5%, 13.25%, 13%, 12.75%, 12.5%, 12.25%, 12%, 11.75%, 11.5%, 11.25%, 11%, 10.75%, 10.5%, 10.25%, 10%, 9.75%, and 9.5% by weight of the combined elastomer, crosslinked water swellable superabsorbent polymer, and hydrophobically modified water-soluble polymer in the vulcanized oil and water swellable particulate composite.

In some embodiments, the vulcanized oil and water swellable particulate composites may further comprise one selected from the group consisting of a polyvalent metal oxide; a reinforcing agent; a weighting agent; and any combination thereof. The optional polyvalent metal oxides may serve to aid in compounding the components of the vulcanized oil and water swellable particulate composites described herein and enhance their swellable properties. Suitable polyvalent metal oxides may include, but are not limited to, magnesium oxide; zinc oxide; and any combination thereof. Suitable polyvalent metal oxides may include, but are not limited, to oxides of magnesium, calcium, barium, zinc, aluminum, titanium, zirconium, or bismuth; or bentonite, silica, zeolite, clay, talc, satin white, or smectite. In preferred embodiments, the polyvalent metal oxide may be magnesium oxide; zinc oxide; and any combination thereof. In some embodiments, the optional polyvalent metal oxide may be present in the range of a lower limit of about 0.01%, 0.1%, 0.2%, 0.3%, 0.4%, 0.5%, 0.6%, 0.7%, 0.8%, 0.9%, and 1% to an upper limit of about 2%, 1.9%, 1.8%, 1.7%, 1.6%, 1.5%, 1.4%, 1.3%, 1.2%, 1.1%, and 1% by weight of the combined elastomer, crosslinked water swellable superabsorbent polymer, and hydrophobically modified water-soluble polymer in the vulcanized oil and water swellable particulate composite.

The optional reinforcing agent may serve to increase the hardness of the vulcanized oil and water swellable particulate composites after vulcanization, as compared to identically formed vulcanized oil and water swellable particulate composites without the reinforcing agent. Suitable reinforcing agents may include, but are not limited to, carbon black; silica; and any combination thereof, including carbon black having silica deposited on its surface. In some embodiments, the optional reinforcing agent may be present in the range of a lower limit of about 0.01%, 0.1%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, 10%, 10.5%, 11%, 11.5%, 12%, 12.5%, 13%, 13.5%, 14%, 14.5%, and 15% to an upper limit of about 30%, 29.5%, 29%, 28.5%, 28%, 27.5%, 27%, 26.5%, 26%, 25.5%, 25%, 24.5%, 24%, 23.5%, 23%, 22.5%, 22%, 21.5%, 21%, 20.5%, 20%, 19.5%, 19%, 18.5%, 18%, 17.5%, 17%, 16.5%, 16%, 15.5%, and 15% by weight of the combined elastomer, crosslinked water swellable superabsorbent polymer, and hydrophobically modified water-soluble polymer in the vulcanized oil and water swellable particulate composite.

The weighting agents may be included in the vulcanized oil and water swellable particulate composite so as to increase the density of the composite such that it is, for example, similar in density to a fluid in which it may be suspended. For example, in those embodiments in which the vulcanized oil and water swellable particulate composites are included in a self-sealing cement slurry comprising the vulcanized oil and water swellable particulate composites, an aqueous base fluid, and cementitious material, the weighting agents may be included such that the density of the vulcanized oil and water swellable particulate composites are equal to or similar to the self-sealing cement slurry, thus fostering a more homogeneous distribution of the vulcanized oil and water swellable particulate composites therein. Suitable weighting agents may include, but are not limited to, barium sulfate; potassium chloride; sodium chloride; sodium bromide; calcium chloride; calcium bromide; ammonium chloride; zinc bromide; zinc formate; zinc oxide; and any combination thereof. In some embodiments, the weighting agent may be present in the range of a lower limit of about 0.1%, 0.25%, 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5%, 5.25%, and 5.5% to an upper limit of about 10%, 9.75%, 9.5%, 9.25%, 9%, 8.75%, 8.5%, 8.25%, 8%, 7.75%, 7.5%, 7.25%, 7%, 6.75%, 6.5%, 6.25%, 6%, 5.75%, and 5.5% by weight of the combined elastomer, crosslinked water swellable superabsorbent polymer, and hydrophobically modified water-soluble polymer in the vulcanized oil and water swellable particulate composite. However, the amount of optional weighting agent included in the vulcanized oil and water swellable particulate composites will depend on the weighting agent selected, the fluid into which the vulcanized oil and water swellable particulate composite is to be included, and the like.

The vulcanized oil and water swellable particulate composites swell in the presence of non-aqueous and aqueous fluids. In some embodiments, the vulcanized oil and water swellable particulate composites are capable of swelling in a range of from about 20% to about 400% by weight in dry form. They are capable of maintaining their form (i.e., they do not separate or disintegrate into the individual components making up the vulcanized oil and water swellable particulate composites) and thus do not adversely affect the fluids or slurries into which they may be placed, such as the self-sealing cement slurries disclosed herein. Within the set self-sealing cement sheath, the vulcanized oil and water swellable particulate composites upon exposure to aqueous or non-aqueous fluid may swell and fill channels or fluid flowpaths of various sizes (i.e., large channels as well as microannuli) formed as a result of loss of integrity to the set self-sealing cement slurries. The vulcanized oil and water swellable particulate composites are also capable of compensating for shrinkage of the self-sealing cement slurries during the shrinking phase as the cement sets. The vulcanized oil and water swellable particulate composites may be capable of preventing or reducing shrinkage as the cement sets because of their increased particulate volume in the partially or fully swollen state from exposure to fluids in the cement slurry (e.g., water). The self-sealing cement slurries may be placed into a downhole location and at least partially set during which phase the degree of cement shrinkage is maximum. Moreover, the presence of the vulcanized oil and water swellable particulate composites may additionally impart flexibility and resiliency to the self-sealing cement slurries described herein after it is set and during the life of the well, enabling the cement sheath to resist brittle failure under stresses imposed by pressure and temperature changes. Thus, the mere presence of the vulcanized oil and water swellable particulate composites may both prevent or reduce the initial formation of channels and flowpaths, or enhancement thereof, by preventing or reducing structural integrity losses to the self-sealing cement slurry at the outset, as well as swell to fill any such channels or flowpaths that are formed due to structural integrity losses.

The self-sealing cement slurries described herein may comprise the vulcanized oil and water swellable particulate composites, which may be included in the self-sealing cement slurries after storage in dry form or storage in a high salinity aqueous solution or a non-swelling non-aqueous solvent (e.g., a hydroxylic solvent such as ethylene glycol or glycerol) to prevent or minimize swelling of the vulcanized oil and water swellable particulate composites while in storage form. Upon inclusion of the high salinity aqueous solution or the non-swelling non-aqueous solvent comprising the vulcanized oil and gas swellable composites into the self-sealing cement slurry, the high salinity aqueous solution or the non-swelling non-aqueous solvent may be sufficiently diluted to allow full swelling of the vulcanized oil and gas swellable composite. In addition, other additives may be included in the self-sealing cement slurry to reverse any effects of the high salinity solution that may hinder swelling of the vulcanized oil and water swellable particulate composites described herein. In other embodiments, the vulcanized oil and gas swellable composites may be encapsulated (such as with an encapsulating polymer) so as to facilitate storage or to delay swelling until a particular time or when a particular condition is met in the subterranean formation (e.g., upon reaching a particular pressure or temperature). In some embodiments, the vulcanized oil and water swellable particulate composites, whether in dry form, suspended in a high salinity aqueous solution or the non-swelling non-aqueous solvent, or encapsulated, may be present in an amount in the range of a lower limit of about 0.1%, 0.25%, 0.5%, 0.75%, 1%, 1.25%, 1.5%, 1.75%, 2%, 2.25%, 2.5%, 2.75%, 3%, 3.25%, 3.5%, 3.75%, 4%, 4.25%, 4.5%, 4.75%, 5%, 5.25%, 5.5%, 5.75%, 6%, 6.25%, 6.5%, 6.75%, 7%, 7.25%, 7.5%, 7.75%, 8%, 8.25%, 8.5%, 8.75%, 9%, 9.25%, 9.5%, 9.75%, and 10% to an upper limit of about 20%, 19.75%, 19.5%, 19.25%, 19%, 18.75%, 18.5%, 18.25%, 18%, 17.75%, 17.5%, 17.25%, 17%, 16.75%, 16.5%, 16.25%, 16%, 15.75%, 15.5%, 15.25%, 15%, 14.75%, 14.5%, 14.25%, 14%, 13.75%, 13.5%, 13.25%, 13%, 12.75%, 12.5%, 12.25%, 12%, 11.75%, 11.5%, 11.25%, 11%, 10.75%, 10.5%, 10.25%, and 10% by weight of the combined aqueous base fluid and cementitious material.

The aqueous base fluid included in the self-sealing cement slurries described herein may include, but are not limited to, any aqueous base fluid suitable for use in a cement slurry for use in a subterranean operation. Suitable aqueous base fluids may include, but are not limited to freshwater; saltwater (e.g., water containing one or more salts dissolved therein); brine; seawater; and any combination thereof. Generally, the aqueous base fluid may be from any source, provided, for example, that it does not contain an excess of compounds that may undesirably affect the vulcanized oil and water swellable particulate composites or the self-sealing cement slurries described herein. In some embodiments, the aqueous base fluid may be included in an amount sufficient to form a pumpable slurry. In some embodiments, the aqueous base fluid may be included in the self-sealing cement slurries in an amount in the range of a lower limit of about 30% by weight ("w/w"), 40% w/w, 50% w/w, 60% w/w, 70% w/w, 80% w/w, 90% w/w, 100% w/w, 110% w/w, and 120% w/w to an upper limit of about 200% w/w, 190% w/w, 180% w/w, 170% w/w, 160% w/w, 150% w/w, 140% w/w, 130% w/w, and 120% w/w by weight of the cementitious material. In some embodiments, the base fluid may be included in an amount of about 30% to about 150% w/w of the cementitious material.

The cementitious material for use in the self-sealing cement slurries described herein may be any cementitious material suitable for use in subterranean operations. In preferred embodiments, the cementitious material is a hydraulic cement. Hydraulic cements harden by the process of hydration due to chemical reactions to produce insoluble hydrates (e.g., calcium-silicate hydrate) that occur independent of the cement's water content (e.g., hydraulic cements can harden even under constantly damp conditions). Thus, hydraulic cements are preferred because they are capable of hardening regardless of the water content of a particular subterranean formation. Suitable hydraulic cements include, but are not limited to Portland cement; Portland cement blends (e.g., Portland blast-furnace slag cement and/or expansive cement); non-Portland hydraulic cement (e.g., super-sulfated cement, calcium aluminate cement, and/or high magnesium-content cement); and any combination thereof. In some embodiments, the cementitious material may be present in an amount ranging from a lower level of at least about 20%, 25%, 30%, 35%, 40%, 45%, and 50%, to an upper level of equal to or less than about 80%, 75%, 70%, 65%, 60%, 55%, and 50%, wherein each of the percentages are w/w of the combined weight of the vulcanized oil and water swellable particulate composites (including any storage fluid, such as the high salinity solution discussed above) and the cementitious material. In preferred embodiments, the cementitious material may be present in an amount of about 30% to about 60% w/w of the combined weight of the vulcanized oil and water swellable particulate composites (including any storage fluid, such as the high salinity solution discussed above) and the cementitious material.

In some embodiments, a portion of the cementitious material may be formed from pozzolanic material, which may aid in increasing the density and strength of the cementitious material. As used herein the term "pozzolanic material" refers to a siliceous material that is capable of reacting with calcium hydroxide (which may be produced during hydration of a cementitious material) in the presence of water to form a material possessing the qualities of cementitious material. Because calcium hydroxide accounts for a sizable portion of most hydrated hydraulic cements and because calcium hydroxide does not contribute to the cement's properties, the use of pozzolanic material as a portion of the cementitious material may synergistically enhance the strength and quality of the cement. Any pozzolanic material that is reactive with some of the hydration products of the cementitious material (e.g., calcium hydroxide) may be used in the methods and compositions of the embodiments described herein. Suitable pozzolanic materials may include, but are not limited to silica fume; silica flour; metakaolin; fly ash; diatomaceous earth; calcined diatomite; uncalcined diatomite; calcined fullers earth; pozzolanic clays; calcined volcanic ash; uncalcined volcanic ash; bagasse ash; pumice; pumicite; rice hull ash; natural zeolites; synthetic zeolites; slag; vitreous calcium aluminosilicate; cement kiln dust; lime kiln dust; pumice; and any combination thereof. In some embodiments, the pozzolanic material may be present in an amount ranging from a lower level of at least about 1%, 5%, 10%, 15%, 20%, 25%, or 30%, to an upper level of equal to or less than about 40%, 35%, or 30%, wherein each of the percentages are w/w of the cementitious material.

In various embodiments, systems configured for preparing, transporting, and delivering the self-sealing cement slurries comprising the vulcanized oil and water swellable particulate composites described herein to a downhole location are described. In various embodiments, the systems can comprise a pump fluidly coupled to a tubular (e.g., a casing, drill pipe, production tubing, coiled tubing, etc.) extending into a wellbore penetrating a subterranean formation. The tubular may be configured to circulate or otherwise convey the self-sealing cement slurries comprising the vulcanized oil and water swellable particulate composites described herein. The pump may be, for example, a high pressure pump or a low pressure pump, which may depend on, inter alia, the viscosity and density of the self-sealing cement slurries, the type of the cementing operation, and the like.

In some embodiments, the systems described herein may further comprise a mixing tank arranged upstream of the pump and in which the self-sealing cement slurries are formulated. In various embodiments, the pump (e.g., a low pressure pump, a high pressure pump, or a combination thereof) may convey the self-sealing cement slurries from the mixing tank or other source of the self-sealing cement slurries to the tubular. In other embodiments, however, the self-sealing cement slurries can be formulated offsite and transported to a worksite, in which case the self-sealing cement slurries may be introduced to the tubular via the pump directly from a transport vehicle or a shipping container (e.g., a truck, a railcar, a barge, or the like) or from a transport pipeline. In yet other embodiments, the self-sealing cement slurries may be formulated on the fly at the well site where components of the self-sealing cement slurries are pumped from a transport (e.g., a vehicle or pipeline) and mixed during introduction into the tubular. In any case, the self-sealing cement slurries may be drawn into the pump, elevated to an appropriate pressure, and then introduced into the tubular for delivery downhole.

FIG. 1 shows an illustrative schematic of a system that can deliver self-sealing cement slurries of the disclosure to a downhole location, according to one or more embodiments. It should be noted that while FIG. 1 generally depicts a land-based system, it is to be recognized that like systems may be operated in subsea locations as well. As depicted in FIG. 1, system 1 may include mixing tank 10, in which a self-sealing cement slurries of the embodiments described herein may be formulated. Again, in some embodiments, the mixing tank 10 may represent or otherwise be replaced with a transport vehicle or shipping container configured to deliver or otherwise convey the self-sealing cement slurries to the well site. The self-sealing cement slurries may be conveyed via line 12 to wellhead 14, where the self-sealing cement slurries enters tubular 16 (e.g., a casing, drill pipe, production tubing, coiled tubing, etc.), tubular 16 extending from wellhead 14 into wellbore 22 penetrating subterranean formation 18. Upon being ejected from tubular 16, the self-sealing cement slurries may subsequently return up the wellbore in the annulus between the tubular 16 and the wellbore 22 as indicated by flow lines 24. In other embodiments, the self-sealing cement slurries may be reverse pumped down through the annulus and up tubular 16 back to the surface, without departing from the scope of the disclosure. Pump 20 may be configured to raise the pressure of the self-sealing cement slurries to a desired degree before its introduction into tubular 16 (or annulus). It is to be recognized that system 1 is merely exemplary in nature and various additional components may be present that have not necessarily been depicted in FIG. 1 in the interest of clarity. Non-limiting additional components that may be present include, but are not limited to, supply hoppers, pneumatic transport lines, pneumatic cement mixing head, induction mixing system, valves, condensors, adapters, joints, gauges, sensors, compressors, pressure controllers, pressure sensors, flow rate controllers, flow rate sensors, temperature sensors, and the like.

One skilled in the art, with the benefit of this disclosure, should recognize the changes to the system described in FIG. 1 to provide for other cementing operations (e.g., squeeze operations, reverse cementing (where the cement in introduced into an annulus between a tubular and the wellbore and returns to the wellhead through the tubular), and the like).

It is also to be recognized that the disclosed self-sealing cement slurries may also directly or indirectly affect the various downhole equipment and tools that may come into contact with the treatment fluids during operation. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), wellbore projectiles (e.g., wipers, plugs, darts, balls, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIG. 1.

Embodiments disclosed herein include:

A. A method comprising: providing a self-sealing cement slurry comprising an aqueous base fluid, a cementitious material, and a vulcanized oil and water swellable particulate composite, wherein the vulcanized oil and water swellable particulate composite comprises an elastomer, a crosslinked water swellable superabsorbent polymer, and a hydrophobically modified water-soluble polymer; introducing the self-sealing cement slurry into a subterranean formation; and allowing the self-sealing cement slurry to set, wherein the vulcanized oil and water swellable particulate composite is capable of swelling in the presence of a non-aqueous fluid and an aqueous fluid to reduce the permeability of fluid flowpaths in the set self-sealing cement slurry upon loss of structural integrity.

B. A vulcanized oil and water swellable particulate composite comprising: an elastomer, a crosslinked water swellable superabsorbent polymer, and a hydrophobically modified water-soluble polymer, wherein the elastomer comprises a non-polar monomer, a polar monomer, and an ionizable polar monomer, and wherein the vulcanized oil and water swellable particulate composite is capable of swelling in the presence of a non-aqueous fluid and an aqueous fluid.

Each of embodiments A and B may have one or more of the following additional elements in any combination:

Element 1: Wherein the elastomer comprises a non-polar monomer, a polar monomer, and an ionizable polar monomer.

Element 2: Wherein the non-polar monomer is selected from the group consisting of a diene; a substituted diene; an alpha-olefin; and any combination thereof.

Element 3: Wherein the polar monomer is non-ionic.

Element 4: Wherein the polar monomer is selected from the group consisting of an acrylonitrile; a N-alkoxyalkyl acrylamide; a vinyl acetate; a vinylformamide; a vinyl acetamide; a vinyl methyl ether; a vinyl pyrrolidone; an acrylate; a vinyl siloxane; and any combination thereof.

Element 5: Wherein the polar monomer is capable of generating a carboxylate group.

Element 6: Wherein the ionizable polar monomer is selected from the group consisting of a carboxylic acid; a carboxylic acid derivative; a salt of carboxylic acid; a sulfonic acid; a salt of sulfonic acid; and any combination thereof.

Element 7: Wherein the crosslinked water swellable superabsorbent polymer is selected from the group consisting of a crosslinked polyacrylate-based polymer; a crosslinked polyacrylamide-based polymer; a crosslinked polyvinyl alcohol polymer; a crosslinked starch-polyacrylonitrile graft polymer; any copolymer thereof; any terpolymer thereof; and any combination thereof.

Element 8: Wherein the hydrophobically modified water-soluble polymer is formed by hydrophobic modification of a hydrophilic polymer.

Element 9: Wherein the hydrophobically modified water-soluble polymer is formed by a polymerization reaction of a hydrophilic monomer and a hydrophobically modified hydrophilic monomer.

Element 10: Wherein the vulcanized oil and water swellable particulate composite further comprises a polyvalent metal oxide; a reinforcing material; and any combination thereof.

By way of non-limiting example, exemplary combinations applicable to A and B include: A with 1, 3, and 5; A with 2 and 10; B with 4, 7, and 8; and B with 6 and 9.

To facilitate a better understanding of the embodiments described herein, the following examples of preferred or representative embodiments are given. In no way should the following examples be read to limit, or to define, the scope of the disclosure.

EXAMPLE

A vulcanized oil and water swellable particulate composite was prepared according to some embodiments described herein using first melt blending (mastication) followed by molding. The vulcanized oil and water swellable particulate composites were melt blended using a rubber mixer supplied by Brabender. The three platens of the rubber mixer were pre-heated at 70° C. (158° F.) and the screw rotation rate was set at 30 RPM. The rubber mixer was loaded in the following order: elastomer, hydrophobically modified water-soluble polymer, swellable superabsorbent polymer (the swellable superabsorbent polymer was premixed prior to melt blending), reinforcing agent, and vulcanizing agent, each described below. The mixture was blended in the rubber mixer for 30 minutes at 30 RPM. The mixture was removed and cut into small pieces for molding into cubic prisms. To mold the mixture into cubic prisms, about 6 grams of the mixture was loaded into a 2.54 cm×2.54 cm×0.64 cm (1 in×1 in×0.25 in) metal mold and vulcanized (cured) and compression molded at 177° C. (350.6° F.) for 20 minutes under a load of about 2000 to 3000 pounds.

In this example, the ability of the vulcanized oil and water swellable particulate composites made according to the process described above to swell in the presence of an aqueous fluid were evaluated: (1) when the elastomer in the vulcanized oil and water swellable particulate composite is a crosslinked carboxylated butadiene acrylonitrile ("XNBR"), as described in the embodiments herein, as compared to a non-carboxylated butadiene acrylonitrile ("NBR") (i.e., without the ionizable polar monomer) (Control Composition 1 ("CC1")), (2) when the vulcanized oil and water swellable particulate composites comprise a hydrophobically modified water-soluble polymer (e.g., NATROSOL® PLUS CS, Grade 330; PEMULEN™ TR-1; and PEMULEN™ TR-2, as described herein), as compared to a non-hydrophobically modified water soluble hydroxyethyl cellulose polymer (or Free Water Control Agent, "FWCA") (Control Composition 2 ("CC2")), (3) when the amount and type of hydrophobically modified water-soluble polymer is varied, and (4) when the vulcanized oil and water swellable particulate composite further comprises the polyvalent metal oxide, magnesium oxide. The Test Composites are labeled TC1 through TC5. The compositions of the composites are included in TABLE 1, and are described in parts per hundred rubber with reference to the elastomer ("PHR").

TABLE 1

| Component | CC1 | CC2 | TC1 | TC2 | TC3 | TC4 | TC5 |
|---|---|---|---|---|---|---|---|
| ELASTOMER | | | | | | | |
| XNBR | | 100 | 100 | 100 | 100 | 100 | 100 |
| NBR | 100 | | | | | | |
| WATER-SOLUBLE POLYMER | | | | | | | |
| FWCA (non-hyrophobically modified water-soluble hydroxyethyl cellulose polymer) | | 10 | | | | | |
| NATROSOL ® PLUS CS, Grade 330 (hydrophobically modified hydroxyethyl cellulose) | | | | 10 | 20 | | |
| PEMULEN ™ TR-1 (hydrophobically modified polyacrylic | | | | | | 10 | 10 |

TABLE 1-continued

| Component | CC1 | CC2 | TC1 | TC2 | TC3 | TC4 | TC5 |
|---|---|---|---|---|---|---|---|
| acid with low level of hydrophobic groups) | | | | | | | |
| PEMULEN ™ TR-2 (hydrophobically modified polyacrylic acid with high level of hydrophobic groups) | 10 | | 10 | | | | |
| SUPERABSORBENT POLYMER | | | | | | | |
| HYSORB ™ 8100 | 100 | 100 | 100 | 100 | 100 | 100 | 100 |
| VULCANIZING AGENT | | | | | | | |
| VUL-CUP 40KE | 2 | 2 | 2 | 2 | 2 | 2 | 2 |
| REINFORCING AGENT | | | | | | | |
| Carbon Black | 30 | 30 | 30 | 30 | 30 | 30 | 30 |
| POLYVALENT METAL OXIDE | | | | | | | |
| Magnesium Oxide | | | | | | | 1 |
| WATER | | | | | | | |
| Fresh Water | 30 | 30 | 30 | 30 | 30 | 30 | 30 |

Molded prisms of 2.54 cm×2.54 cm×0.635 cm (1 in×1 in×0.25 in) of each of CC1, CC2, or TC1-TC5 were submerged separately in both 150 mL of fresh water and a 150 mL of a 1% NaCl solution for 7 days at 22.22° C. (72° F.) and tested for hardness using a Shore A durometer and observed for swelling behavior. The Shore A hardness results are listed in TABLE 2.

The Shore A hardness values are largely similar. However, the swellability observations demonstrate the superiority of the vulcanized oil and water swellable particulate composites as described herein. First, ionic polar groups (carboxylate groups in this example) improve elastomer performance, as compared to elastomers lacking such groups. Such improved performance is likely due to improved compatibility between the elastomer, the crosslinked water swellable superabsorbent polymers, and the hydrophobically modified water-soluble polymer.

TABLE 2

| | CC1 | CC2 | TC1 | TC2 | TC3 | TC4 | TC5 |
|---|---|---|---|---|---|---|---|
| Shore A Hardness | 90 | 93 | 90 | 92 | 91 | 93 | 93 |

Comparing the swellability observations of CC1 to TC1, CC1 is identical to TC1, except that TC1 comprises a carboxylated elastomer, having an ionizable polar monomer. CC1 released more reinforcing agent into the fresh water that it was submerged in, suggesting that the ionizable polar groups improve elastomer performance.

CC2 lacked a hydrophobically modified water-soluble polymer, comprising instead a non-hydrophobically modified water-soluble polymer. The particulate composite released swollen gel blobs, released carbon black into the fresh water that it was submerged in, and the fresh water was viscous, demonstrating that either the non-hydrophobically modified water-soluble polymer in the particulate composite was not able to adequately retain the crosslinked water-swellable superabsorbent polymer or preferred to leach into the aqueous fluid. Comparing CC2 to TC1 through TC5, each one having a hydrophobically modified water-soluble polymer in accordance with the embodiments described herein, TC1 through TC5 exhibited less or no released swollen gel blobs and less or no increase in viscosity in the fresh water.

Comparing TC2 and TC3, each identical except that TC3 comprised an increased amount of NATROSOL® PLUS CS, Grade 330 (hydrophobically modified hydroxyethyl cellulose), both demonstrated less swollen gel blobs in comparison to CC2, which lacked a hydrophobically modified water-soluble polymer, less release of carbon black into the fresh water, and less or no increase in viscosity of the fresh water. This indicates that the presence of a hydrophobically modified water-soluble polymer in the vulcanized oil and water swellable particulate composites described herein improves swelling behavior and increased resistance to separation of the various components of the particulate composite.

Comparing TC1 and TC4, the increased hydrophobic groups present in the hydrophobically modified water-soluble polymer in TC4 compared to TC1 improved the swelling behavior and reduced the release of carbon black, demonstrating that higher levels of hydrophobic groups may be preferred.

Comparing TC4 and TC5, each identical except that TC5 additionally comprises a polyvalent metal oxide, magnesium oxide, TC5 demonstrated improved swellability and reduced carbon black release.

Figure 2:
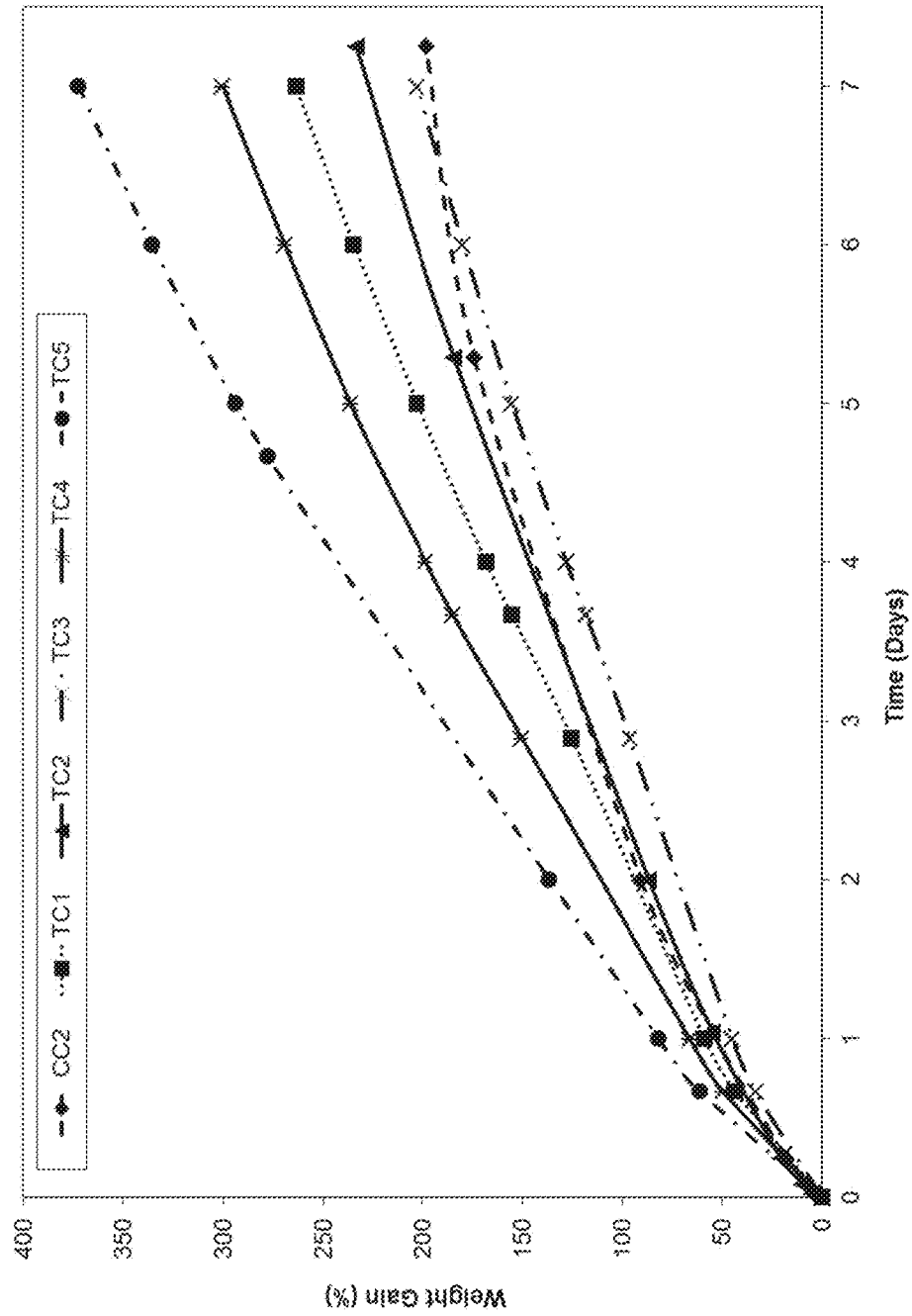
FIG. 2 illustrates the swellability rate (or % weight gain) of several vulcanized oil and water swellable particulate composite compositions in fresh water at low temperature.
Figure 3:
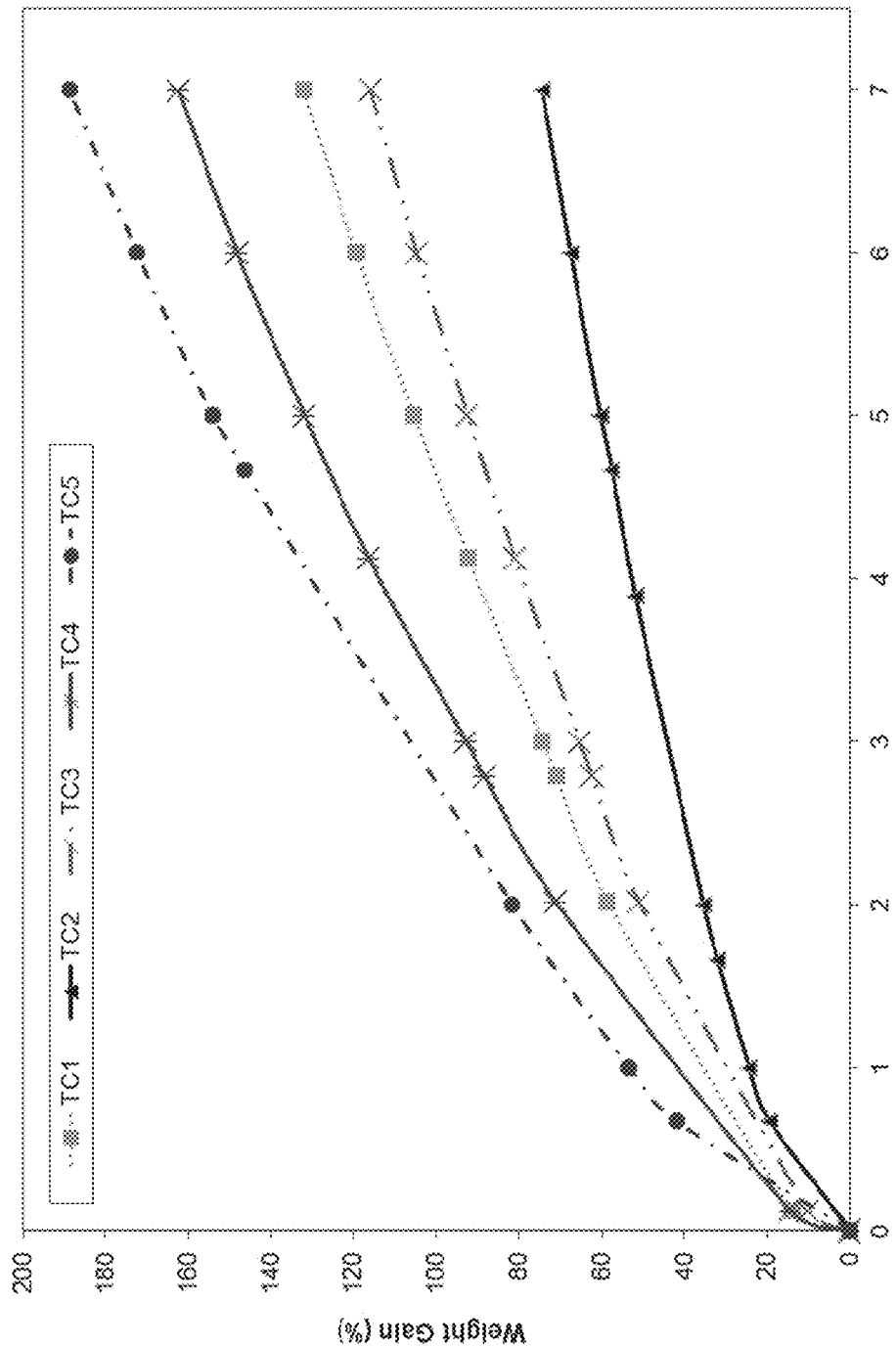
FIG. 3 illustrates the swellability rate (or % weight gain) of several vulcanized oil and water swellable particulate composite compositions in a brine solution (1% NaCl) at low temperature.

Molded prisms of 2.54 cm×2.54 cm×0.635 cm (1 in×1 in×0.25 in) of each of CC2 and TC1-TC5 were submerged separately in 150 mL of fresh water at 22.2° C. (72° F.) for 7 days and evaluated for weight gain (i.e., swellability rates) at various time periods between day 1 through day 7. FIG. 2 shows a graphical depiction of the results. Molded prisms of 2.54 cm×2.54 cm×0.635 cm (1 in×1 in×0.25 in) of each of TC1-TC5 were submerged separately in 150 mL of a 1% NaCl solution at 22.2° C. (72° F.) for 7 days and evaluated for weight gain (i.e., swellability rates) at various time periods between day 1 through day 7. FIG. 3 shows a graphical depiction of the results. FIG. 2 and FIG. 3 show a graphical depiction of the swellability observations discussed above and indicate that very high swell rates can be obtained using the vulcanized oil and water swellable particulate composites disclosed herein, both at low temperatures and in the presence of a salt solution. Indeed, the vulcanized oil and water swellable particulate composites of the embodiments herein are capable of absorbing water in the range of about 20% to about 400% by weight in dry form.

Therefore, the embodiments disclosed herein are well adapted to attain the ends and advantages mentioned as well as those that are inherent therein. The particular embodiments disclosed above are illustrative only, as they may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the disclosure. The embodiments illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A vulcanized oil and water swellable particulate composite comprising:
    an elastomer, a crosslinked water swellable superabsorbent polymer, and a hydrophobically modified water-soluble polymer,
        wherein the elastomer comprises a non-polar monomer, a polar monomer, and an ionizable polar monomer, and
        wherein the vulcanized oil and water swellable particulate composite is capable of swelling in the presence of a non-aqueous fluid and an aqueous fluid.

2. The composite of claim 1, wherein the non-polar monomer is selected from the group consisting of a diene; a substituted diene; an alpha-olefin; and any combination thereof.

3. The composite of claim 1, wherein the polar monomer is non-ionic.

4. The composite of claim 1, wherein the polar monomer is selected from the group consisting of an acrylonitrile; a N-alkoxyalkyl acrylamide; a vinyl acetate; a vinylformamide; a vinyl acetamide; a vinyl methyl ether; a vinyl pyrrolidone; an acrylate; a vinyl siloxane; and any combination thereof.

5. The composite of claim 1, wherein the polar monomer is capable of generating a carboxylate group.

6. The composite of claim 1, wherein the ionizable polar monomer is selected from the group consisting of a carboxylic acid; a carboxylic acid derivative; a salt of carboxylic acid; a sulfonic acid; a salt of sulfonic acid; and any combination thereof.

7. The composite of claim 1, wherein the hydrophobically modified water-soluble polymer is formed by hydrophobic modification of a hydrophilic polymer.

8. The composite of claim 1, wherein the hydrophobically modified water-soluble polymer is formed by a polymerization reaction of a hydrophilic monomer and a hydrophobically modified hydrophilic monomer.

9. The composite of claim 1, wherein the vulcanized oil and water swellable particulate composite further comprises a polyvalent metal oxide; a reinforcing material; and any combination thereof.

10. A vulcanized oil and water swellable particulate composite comprising:
    an elastomer, a crosslinked water swellable superabsorbent polymer, and a hydrophobically modified water-soluble polymer,
        wherein the elastomer comprises a non-polar monomer, a polar monomer, and an ionizable polar monomer,
        wherein the vulcanized oil and water swellable particulate composite is capable of swelling in the presence of a non-aqueous fluid and an aqueous fluid, and
        wherein the crosslinked water swellable superabsorbent polymer is selected from the group consisting of a crosslinked polyacrylate-based polymer; a crosslinked polyacrylamide-based polymer; a crosslinked polyvinyl alcohol polymer; a crosslinked starch-polyacrylonitrile graft polymer; any copolymer thereof; any terpolymer thereof; and any combination thereof.

11. The composite of claim 10, wherein the non-polar monomer is selected from the group consisting of a diene; a substituted diene; an alpha-olefin; and any combination thereof.

12. The composite of claim 10, wherein the polar monomer is non-ionic.

13. The composite of claim 10, wherein the polar monomer is selected from the group consisting of an acrylonitrile; a N-alkoxyalkyl acrylamide; a vinyl acetate; a vinylformamide; a vinyl acetamide; a vinyl methyl ether; a vinyl pyrrolidone; an acrylate; a vinyl siloxane; and any combination thereof.

14. The composite of claim 10, wherein the polar monomer is capable of generating a carboxylate group.

15. The composite of claim 10, wherein the ionizable polar monomer is selected from the group consisting of a carboxylic acid; a carboxylic acid derivative; a salt of carboxylic acid; a sulfonic acid; a salt of sulfonic acid; and any combination thereof.

16. The composite of claim 10, wherein the hydrophobically modified water-soluble polymer is formed by hydrophobic modification of a hydrophilic polymer.

17. The composite of claim 10, wherein the hydrophobically modified water-soluble polymer is formed by a polymerization reaction of a hydrophilic monomer and a hydrophobically modified hydrophilic monomer.

18. The composite of claim 10, wherein the vulcanized oil and water swellable particulate composite further comprises a polyvalent metal oxide; a reinforcing material; and any combination thereof.

* * * * *